Figure 1:
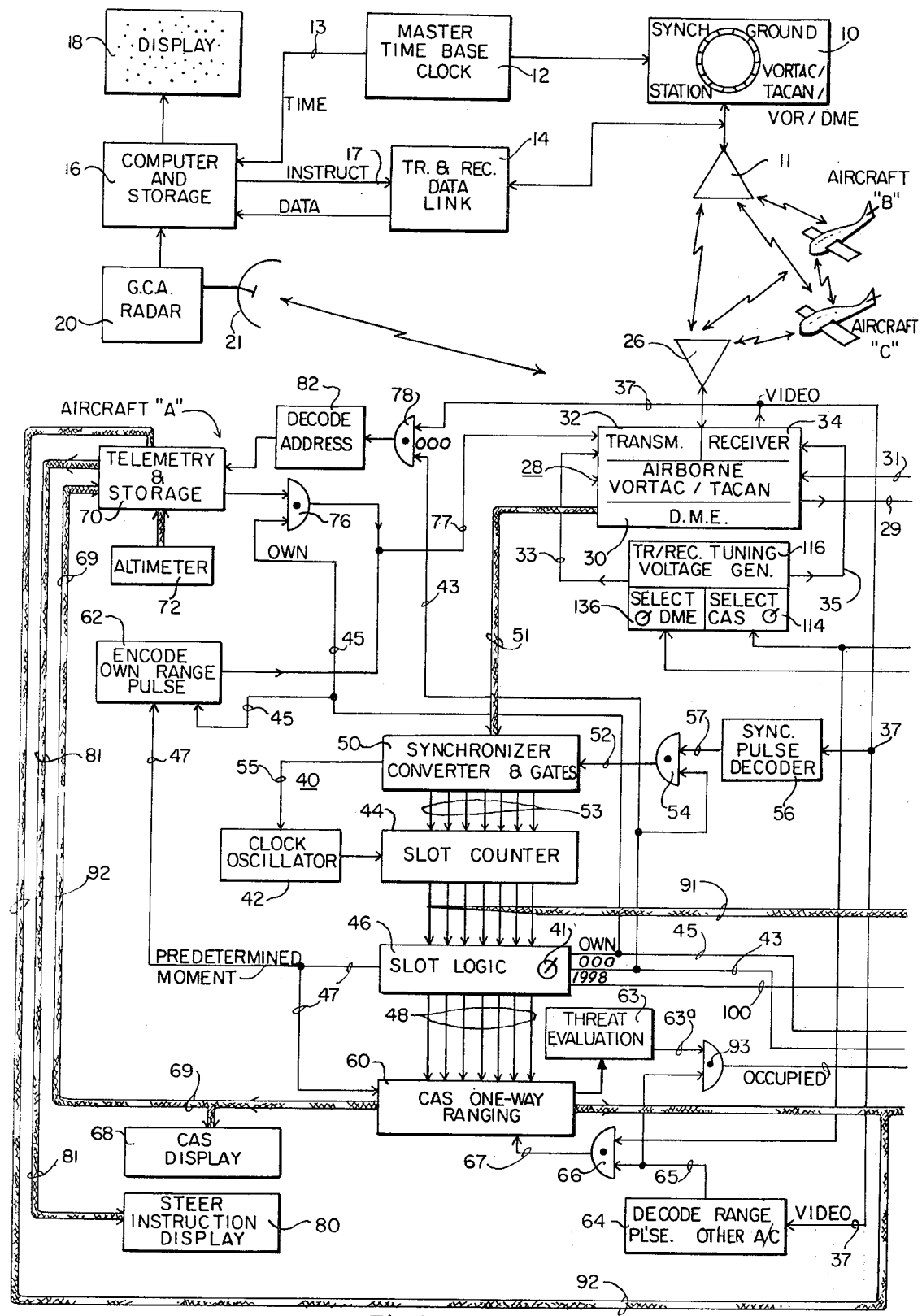

United States Patent [19]

Chisholm

[11] 3,801,979
[45] Apr. 2, 1974

[54] INTEGRATED COLLISION AVOIDANCE, DME, TELEMETRY, AND SYNCHRONIZATION SYSTEM

[76] Inventor: John P. Chisholm, 16 Joy St., Boston, Mass. 02114

[22] Filed: Apr. 26, 1972

[21] Appl. No.: 247,586

[52] U.S. Cl....... 343/6.5 LC, 343/6 R, 343/112 CA
[51] Int. Cl............................................. G01s 9/56
[58] Field of Search.... 343/112 CA, 7.3, 7.5, 6.5 R, 343/6.5 LC, 6 R; 235/150.23, 150.26

[56] References Cited
UNITED STATES PATENTS

| | | | |
|---|---|---|---|
| 3,458,861 | 7/1969 | Michnik | 343/112 CA |
| 3,594,799 | 7/1971 | Michnik | 343/7.5 |
| 3,564,544 | 2/1971 | Scott et al. | 343/7.5 |
| 3,521,278 | 7/1970 | Michnik et al. | 343/6 R |
| 3,277,467 | 10/1966 | Barney | 343/7.3 |

Primary Examiner—Maynard R. Wilbur
Assistant Examiner—G. E. Montone
Attorney, Agent, or Firm—Alexander & Dowell

[57] ABSTRACT

A time-sharing cyclic time slot system in which DME range measuring functions, collision avoidance functions, clock synchronization functions and/or data telemetry functions are all combined into an integrated repeating time sharing cycle in a non-interfering manner to achieve either general navigation and traffic control, or else stationkeeping, by the orderly exchange of pulse signals between participating ground stations and/or aircraft, and in which the cost of the system is minimized by using already existing ground and/or airborne VORTAC/TACAN/VOR/DME equipment and tuning the airborne transmitters and receivers in an agile manner to the various frequencies assigned for the performance of the above functions.

12 Claims, 4 Drawing Figures

INTEGRATED COLLISION AVOIDANCE, DME, TELEMETRY, AND SYNCHRONIZATION SYSTEM

This invention relates to aircraft navigation systems collision avoidance systems (CAS) and stationkeeping systems and more particularly relates to mutually cooperative systems wherein clocks in the various units divide time into synchronized repeating time slot cycles used to insure non-interfering participation by all suitably equipped aircraft and/or ground units.

Earlier in the evolution of systems of this type, as the various functional capabilities were developed, separate units were added to aircraft and ground stations to perform these functions, i.e., the ground-based and airborne VORTAC/TACAN/VOR/DME units being quite separate and distinct from the master-clock ground stations and from cooperative airborne clocks required for CAS or stationkeeping purposes. A subsequent evolutionary effort then commenced to integrate the various units in order to try to combine some of their functions and thereby decrease costs, complexity, and weight penalty with respect to airborne equipment.

It is a principal object of this invention to further integrate the equipment required to perform the various navigation CAS and stationkeeping functions, and to economize the systems by combining units wherever possible without at the same time degrading system performance.

Prior art efforts to decrease cost and duplication are shown in Michnik U.S. Pat. Nos. 3,458,861; 3,521,278; and 3,521,279 which are similar to each other in that they recognize the existence of large numbers of TACAN, VORTAC, and VOR/DME ground stations all over the world and propose that, instead of building large numbers of new master-time propagating ground stations for CAS purposes, these existing VORTAC/TACAN stations should instead be adapted for use in synchronizing airborne clocks to a master-time base generated on the ground. Such prior art suggests that the regular transmissions of the existing ground stations should all be synchronized to the master time base so that the airborne time clocks can then be synchronized thereto using the DME-measured ranges to those same ground stations. This approach will be referred to hereinafter as "VORTAC-SYNC."

However, the prior art teachings still employed separate receiving and/or transmitting units for CAS purposes for a variety of reasons. In the first place, the frequencies used for performing the CAS air-to-ground or air-to-air ranging are usually in a band which is different from the VORTAC/TACAN/VOR/DME frequency bands, both as already in use and as proposed for the future for example in the CAS specifications adopted by the Air Transport Association of America (ATA). In the second place, a CAS frequency used for one-way ranging could not have been shared for the purpose of determining range from a VORTAC or TACAN station since severe interference would result. Moreover, each TACAN or VORTAC or VOR/DME station requires two different frequencies since it transmits replies on a different frequency than the one on which it receives interrogations. Although in former times the airborne TACAN or VORTAC transmitter receivers were not capable of being retuned to other frequencies in an agile manner which would lend itself to time-sharing of their capabilities, recent technical improvements now provide airborne TACAN or VORTAC and DME transmitters and receivers whose frequency selector means are electronically tuned. Thus, an airborne TACAN or VORTAC transmitter and receiver can now tune in about 1 millisecond in the case of some units or in about 20 microseconds in the case of the very latest equipment, thereby rapidly selecting any one of the several hundred frequency channels currently assigned to VORTAC/TACAN/VOR/DME use. Presumably, the agility of this tuning time will be even further improved in the future.

The present invention proposes that the air-to-ground and air-to-air pulse groups exchanged between units for the purposes of clock synchronization, collision avoidance, one-way range measuring, and even telemetering of information pertaining to navigation and CAS will all be done either on some of said existing VORTAC or TACAN channels or on additional channels in the same general frequency band, and that the same quick-tuned transmitter and receiver means will be used to perform all of the functions under discussion herein.

It is a major object of this invention to provide an improved system for navigation and collision avoidance based on extending the capability of already existing airborne VORTAC/TACAN/VOR/DME transmitting and receiving frequency-selector means to further transmit and receive collision avoidance pulse groups cooperatively with other aircraft or ground stations within a repeating cycle of time slots to which all units are synchronized.

The present disclosure recognizes that the operational duty-cycle of most airborne navigation and CAS equipment is quite low. For instance, a typical airborne TACAN/VORTAC unit performs about 10 DME measurements per second cooperatively with the ground station to which it is tuned, and that only a fraction of a millisecond is usually required to complete each measurement. The remainder of the time it is dormant. On the other hand, CAS units, performing in a time slot cycle, for example the one proposed by the ATA supra, go through one epoch every three seconds each epoch comprising one complete time slot cycle including two-thousand slots of 1,500 microseconds duration. In any practical situation, the majority of these slots will be unoccupied or occupied by an aircraft whose altitude, range rate or distance clearly shows that it poses no present threat in the immediate future, and therefore the CAS system is apt to be in effect dormant for a considerable part of the time during each cycle. Likewise, clock synchronization in the aircraft is accomplished in only a few of the time slots during each epoch and therefore evidences a similar low-duty cycle. Clock synchronization may become unnecessary eventually when the cost of atomic clocks is reduced to the point where they replace crystal oscillators in the aircraft.

It is a primary object of this invention to provide ways for sequentially combining the various low duty-cycle functions set forth above, and others mentioned hereinafter, so that equipment capable of sequentially participating in all of the several functions will be timely selected and/or tuned to participate without substantially degrading the performance of any of the functions.

When combining functions into an integrated sequence, i.e., combining for example the DME distance measuring function with an airborne clock synchronizing function and with a CAS function, it is necessary to consider the fact that their requirements are different.

Assume, for example, that the CAS function uses the three-second ATA cycle of two thousand repeating 1,500-microsecond time slots, some of which are uniquely occupied by aircraft and others of which are vacant. Now, if the time slots are randomly assigned to aircraft entering and leaving the general area, there will be no time during an epoch which can be arbitrarily disregarded for collision avoidance vigilance. Moreover, the boundaries within each epoch are world-wide, having been established by a common master-clock time base, and so the CAS function can not be altered to suit the convenience of a participating aircraft or group of aircraft. Even the clock synchronizing function is tied to the certain time slots in the epoch according to the ATA format. On the other hand, the DME distance measuring function is not tied to a predetermined time base, but enjoys flexibility as long as certain general needs are reasonably observed. For instance, the system must not operate in such a way that the times of interrogation of any of the VORTAC/TACAN stations become clustered, with the result that a ground station might be overworked at one time in the sequence and almost dormant at another time. This factor rules out the idea of arbitrarily selecting fixed portions of the CAS epoch for interrogation of DME ground stations by all aircraft. These measured distances obtained as a result of interrogation of the DME station are used, inter alia, for synchronizing the airborne clock which is done by the airborne unit in response to SYNC pulse groups broadcast by the ground station at multiple times during each epoch, for instance during 30 time slots set aside for this purpose during which the airborne units simply listen.

One way to provide a practical system is to have the CAS function accomplished by all aircraft on a common CAS frequency, and to have all aircraft periodically monitor all of the CAS time slots for the purpose of determining which slots are vacant, or occupied at the moment by aircraft that could pose a threat of collision. When this has been determined, the aircraft will then fit their DME functions into the CAS time base so as to avoid performing their DME functions in any of the threateningly occupied CAS time slots. With two thousand time slots per cycle, presumably there will be many vacancies resulting from lack of occupancy at all or else from occupancy by an aircraft posing no actual threat at the present time, whereby the truly required CAS duty cycle is even lower that it would seem to be if "occupancy" or "vacancy" alone were used as the sole determining criterion. An optimum system should therefore either detect threateningly occupied slots and inhibit the DME function thereduring, or else detect vacant slot intervals and trigger the DME function during them. However, such monitoring of the CAS slots requires either an auxiliary receiver listening to the CAS frequency all of the time, plus logic to keep track of gaps in the CAS duty cycle, or else the DME function must be interrupted periodically while a complete CAS epoch is monitored by the common receiver to determine which slots are silent. In either event, logic is required to process the monitored results. As mentioned above, the state of the prior art at present is to use separate transmitters and receivers to perform the various CAS functions, VORTAC/TACAN/DME functions, and the clock sync functions; whereas it is the purpose of this invention to teach time-sharing real-time integration of these functions so that a single fast-tuning transmitter and receiver can handle all RF signals necessary for the various functions when combined with suitable new logic. A basic object of this invention is to reduce costs of CAS equipment so as to bring it within the economic reach of general aviation aircraft, and therefore the single-receiver approach just mentioned in this paragraph will be further considered.

It was pointed out above that if the DME function is periodically omitted from the overall sequence of functions, the receiver can be tuned to the CAS function frequency and left there long enough to monitor a series of time slots. This will result in no degradation at all of the CAS function, but it will eliminate all DME measurements during a slot monitoring interval. Although this is technically a degradation, it can be a harmless one. From the navigational viewpoint, the occasional loss of distance measurement to a VORTAC/TACAN/DME station for several seconds is not objectionable because a standard DME is capable of providing range indications despite loss of signal for up to ten seconds using a technique known as "velocity coasting." Moreover, from the viewpoint of airborne clock synchronization, the periodic failure to resynchronize for several seconds at a time is not objectionable provided the clock stability in the aircraft is such as will keep the clock drift within tolerance for that interval, an easily met requirement.

The present invention therefore provides a general navigation control system in which the DME function is periodically silenced for the interval of at least a portion of one CAS time slot cycle, and the receiver is tuned to the CAS frequency there-during to detect and store in suitable memory discrete indications of various slots of the CAS cycle that are threateningly occupied and must not be interrupted for DME functions, or indications of slots that are not so occupied and can be safely used for ordinary DME measurements including measurements of distance incident to airborne clock synchronization, for example as taught in the above mentioned Michnik patents. This monitoring of all of the time slots to determine occupancy or vacancy can be done as often or as seldom as seems desirable. On the other hand, in a self-contained "stationkeeping" situation in which the occupancy of the slots is known in advance and subject to control by a unified command as will be discussed hereinafter, slot monitoring may be omitted altogether since the information which it is designed to gain is already known. However, in a more general traffic control situation it should be done often enough to prevent the loss of effective collision avoidance protection for aircraft newly arriving in the vicinity, and to insure that no occupied slot is overlooked by the system as a result of some momentary interference or signal drop-out condition.

It is another object of the invention to introduce a random factor into the rate at which the various aircraft will monitor the cycles of time slots so that their monitoring intervals do not become grouped together statistically. In this way, the times during which they perform their DME functions will also be randomly distributed and local ground stations will not tend to experience undue congestion of interrogations.

It is another object of the invention to provide a system in which, once the time slots have been monitored for occupancy, this LISTEN information will be used to provide plural-spaced times within succeeding operating intervals during which DME functions will be performed successively to establish a chain of related distance measurements which recur at rates approaching the rate of signal exchanges with VORTAC/TACAN stations which are presently performed by unmodified DME equipment. The unmodified DME has its own internal repetition rate means by which it is normally triggered "on" to take about 10 range measurements per second. As a practical matter, most of these measurements would probably fall within unoccupied portions of the CAS time slot cycle. One way to accomplish noninterference is to inhibit some of these triggerings in cases where they would occur, for instance, during time slots found to be occupied as a result of monitoring of CAS cycles, during the aircraft's own time slot, and during time slots pre-empted for clock synchronization. Alternatively, the airborne DME system could be normally "off" and triggered "on" at favorable times as determined by the results of time slot monitoring.

In an integrated multiple function system as just described, assuming that the DME interrogation function is performed on one of the several hundred frequencies available in the present band and that the ground station reply is on another of these frequencies, the two frequencies comprising a channel identifying the particular ground station selected, then yet another of these frequencies in the same band will have to be designated for both transmitting and receiving for CAS ranging, i.e., air-to-air. This means that the transmitter in the aircraft will have to quick-tune between the CAS ranging frequency and the interrogating frequency of the particular VORTAC/TACAN/DME station which has been manually selected by the pilot; and that the receiver in the aircraft will have to quicktune between the same CAS ranging frequency and yet another frequency on which that manually selected VORTAC/TACAN/DME station responds to interrogations.

As briefly mentioned above, some DME units tune to different frequencies within only about 20 microseconds, whereas others tune more slowly, for instance, within about 1 millisecond. Considering the more difficult case where tuning is slow and it is desired to have the DME measure large ranges, everytime the system is to perform a DME function, either to determine distance for navigation or for clock synchronization use, an interval of about four milliseconds, i.e., three consecutive time slots, will be needed. During the first millisecond the transmitter and receiver both tune from the CAS frequency to the respective DME interrogation and reply frequencies assigned to the manually selected TACAN/VORTAC station; and then the second and third millisecond intervals will be used to perform the actual distance measurement; and finally a fourth millisecond will be used to retune the transmitter and receiver both to the common CAS ranging frequency.

A possible modification of the system is to use the later portions of occupied time slots for DME purposes, i.e., where agile transmitters and receivers require only 20 microseconds to retune. If the CAS ranging in such slots is limited to 100 miles, which is consistent with low flying general aviation requirements, then sufficient time will remain in such slots to perform a DME measurement. The decision to make such measurement is done within the slot itself, so that the system is thereby simplified by eliminating the requirement to detect and store the identities of empty slots.

In more advanced systems, it may also be desirable to perform telemetering between each aircraft and another aircraft or a ground computer center. This is especially true in the case of an over-all navigation and ground-controlled traffic system of the type where a ground-based computer computes the geometric configuration of the traffic pattern using altitudes measured at each aircraft and also using inter-aircraft separations measured by the aircraft, and all of this data is telemetered to the computer. Such a system is described in detail in Chisholm U.S. Pat. No. 3,434,140 issued Mar. 18, 1969. Each aircraft can telemeter the data to the ground and to other aircraft in the vicinity during its own time slot and while its transmitter is tuned to the CAS frequency as suggested in this patent, and the other aircraft can receive the data because their own receivers will be tuned to the CAS frequency during the same time slot because this slot has been found by them to be occupied. Moreover, where the ground based system is intended to actively control traffic, it can answer back, either with voice transmissions on a different frequency used by a human controller to talk to the pilot, or else by telemetry transmissions to the aircraft, for instance, during a special time slot, perhaps in the SYNC signal time slot at the beginning of each epoch cycle. In the case of telemetry in either direction as outlined above, no further tuning of either the transmitter or the receiver would be required.

In certain stationkeeping applications, including military, it becomes desirable to utilize the airborne DME (TACAN) unit also for air-to-air ranging in a time slot system. In this application as in CAS, two basic functions must be accomplished, including clock or time-slot synchronization, and including one-way inter-aircraft ranging pulse group exchanges. The clock synchronization is accomplished in a manner similar to that considered above for the CAS system wherein all aircraft involved use a VORTAC/TACAN ground station with "VORTAC SYNC" capability to obtain master time. However, whenever the stationkeeping aircraft are not within range of a ground station or are located in an area where no station exists, then one of the aircraft designated as "master" performs the transponding master-time function, that is, it can first tune its DME unit to receive interrogation pulses from other aircraft in response to which it will transmit replies just as a DME ground station does, but without the necessity of radiating the patterns of squitter pulses provided by conventional DME ground stations. The "master" also periodically sends out clock synchronizing pulse groups just as a "VORTAC SYNC" ground station does.

Having obtained clock synchronization, the airborne units then can switch to transmit their ranging pulses on the one-way ranging frequency in their own assigned time slots, and to receive such ranging groups from other aircraft in the latters' one-way ranging time slots and on the same frequency. The actual process of synchronization to the "master" aircraft for this stationkeeping application can take place in specifically pre-assigned time slots, wherein the occupancy of the time slots is known in advance and wherein it is possible to use the DME interrogation frequency from the follower aircraft to the DME master station in the master or leader aircraft also as the follower aircraft's ranging pulse frequency. Moreover, it is even possible to use the assigned time slot for one DME function in each cycle for each follower aircraft which would tend to insure that at least some of the DME interrogations arriving at any master station will be distributed in time rather than bunched. Thus, the aircraft would need only to switch their receivers between the DME station reply frequency in their own time slot and the interrogation frequency in all other time slots. The above scheme leads itself especially well for stationkeeping purposes, where there is only one "master" station, for instance, in the leader aircraft, although it could also be on the ground so long as there is only a single CAS ranging frequency used by all participating aircraft.

Figure 3:
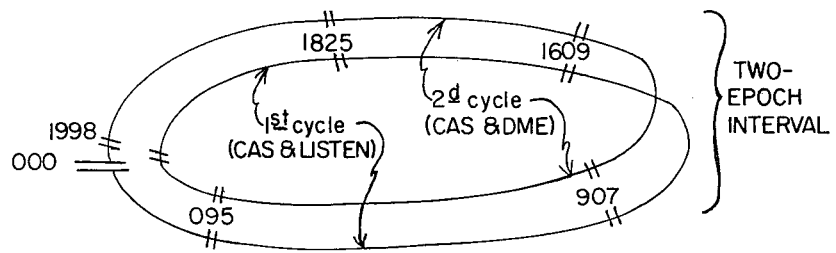
Figure 2:
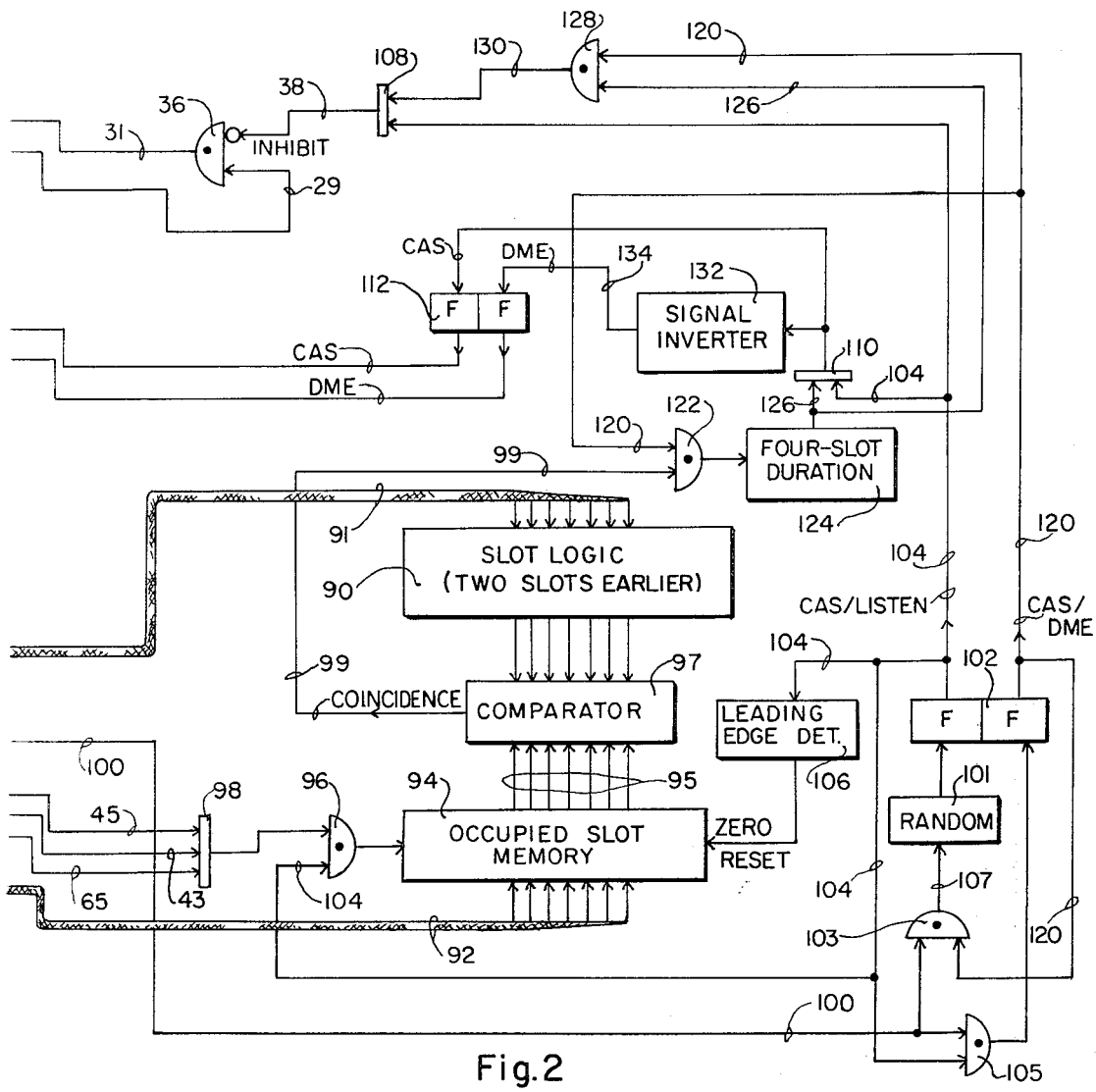
Figure 4:
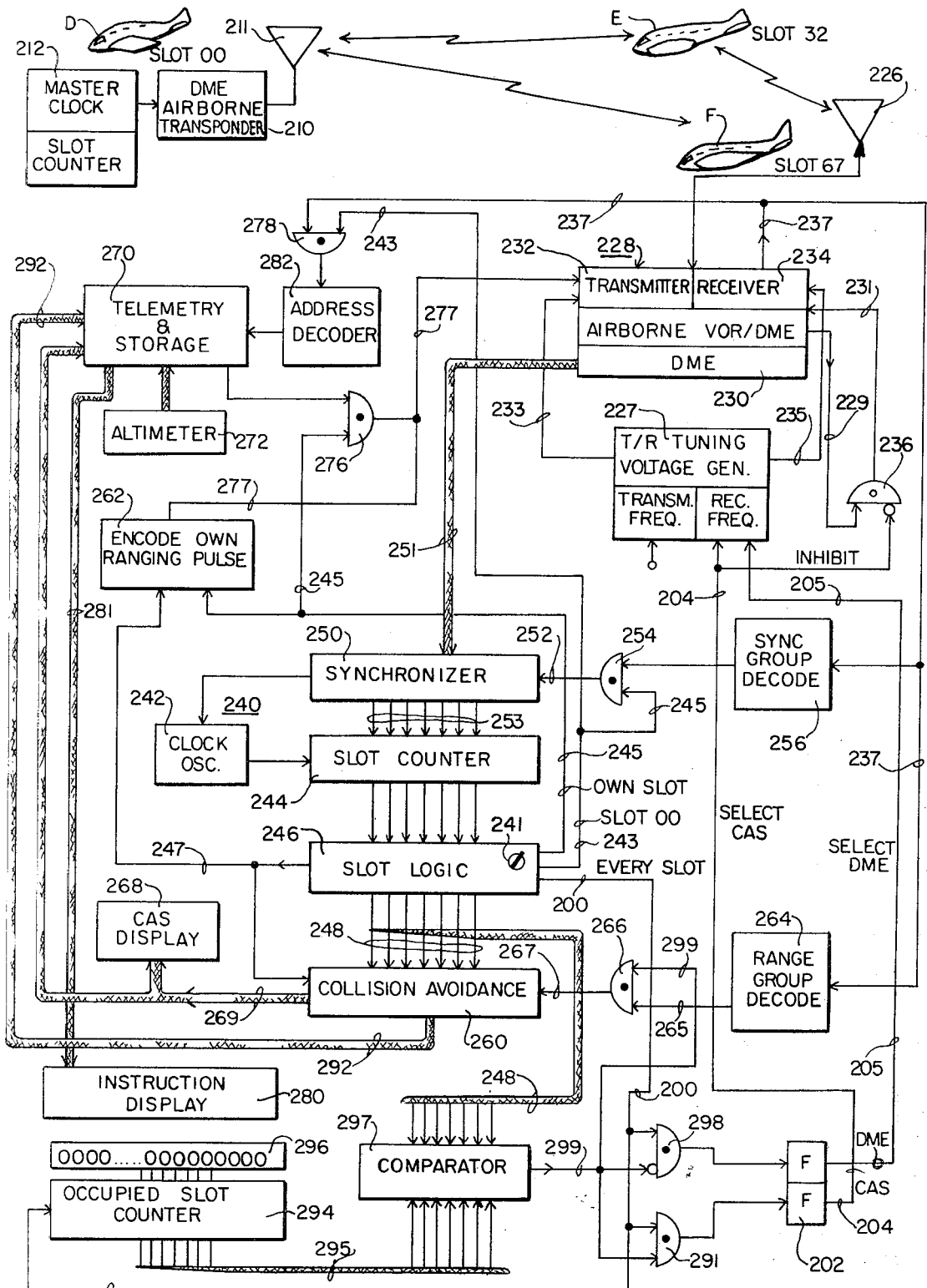

Other objects and advantages of the invention will become apparent during the following discussion of the drawings, wherein:

FIG. 1 and FIG. 2 when combined side-by-side form a composite block diagram of an integrated collision-avoidance synchronized-clock system combined with a VORTAC/TACAN/DME system;

FIG. 3 is an illustration of two epochs each comprising two-thousand 1,500-microsecond time slots, together lasting 6 seconds; and FIG. 4 is a block diagram of another embodiment of an integrated system especially well adapted to stationkeeping.

Referring now to FIGS. 1 and 2, these combined figures show a block diagram of a general air traffic system according to the present invention in which normal TACAN/VORTAC distance measuring functions have been combined with normal collision avoidance functions using as much of the equipment involved in both functions as possible by integrating the functions on a time sharing basis. A portion of the shown system includes certain ground based equipment which is very much as described in the disclosure of my matrix Navigation System, U.S. Pat. No. 3,434,140 when combined with one of the above mentioned Michnik patents, for instance, U.S. Pat. No. 3,521,278. The ground based equipment includes at least one standard VORTAC/TACAN station 10 which is synchronized to a common master time clock and slot counter system 12 so that all of the VORTAC/TACAN stations transmit SYNC simultaneously and as determined by the master time system 12. The master time clock for present illustrative purposes will be assumed to generate a time base of the type set forth in the ATA Specification in which each epoch comprises a cycle including two thousand time slots, each of which is 1,500 microseconds in duration, so that each epoch requires three seconds for completion. The first time slot in at least every alternate epoch includes ground-transmitted synchronizing pulses which are encoded in a group and transmitted through antenna 11 in such a way that they can be recognized in the aircraft by a suitable decoder as comprising clock synchronizing pulses. Alternate epoch cycles actually begin with different transmitted pulse groups in the first time slot, but for the present purposes this difference will be ignored since it does not affect the present discussion.

The VORTAC/TACAN ground station 10 is one of a number of different DME transponder stations, each one of which is specifically selectable by an aircraft by virtue of the fact that it is on different transmit and receive frequencies than any of the other such ground stations in the vicinity. These transmissions and receptions for each such ground station are accomplished via the antenna 11, and the ground station may also have its antenna coupled to a data link transmitter and receiver unit 14 which is continuously operable on the frequency assigned for CAS purposes in that vicinity, or perhaps on several such frequencies. Data coming into the data link 14 is transmitted to a computer and storage facility 16 which, in the manner expressed in my U.S. Pat. No. 3,434,140, for instance, then computes and displays on a display unit 18 the positions of the various aircraft participating in the system. The computer may also be fed information precisely locating aircraft which are nearby, for instance, for purposes of ground controlled approach accomplished by a radar 20 including a directional antenna 21. Moreover, instructions to specific aircraft can be sent to the aircraft by way of the data link transmitter 14 from the computer, or from such other automatic or semi-automatic equipment as may seem desirable.

However, for present purposes the inventive features are to be found in the airborne equipment which is assumed to be contained within an aircraft A which occupies the lower portion of FIG. 1 and FIG. 2, and is one of several aircraft in the vicinity including aircraft B and aircraft C, all similarly equipped. Each aircraft has an antenna 26 by which all signals except for voice signals are transmitted and received, the antenna 26 communicating with the antenna 11 of a particular ground station 10 whose frequencies are selected by the pilot. The antenna 26 is connected to an airborne DME unit 28 which, except for slight modification as will be described hereinafter, is a digital airborne unit purchasable off the shelf from any one of several manufacturers. This airborne DME unit 28 is shown to include a digital distance measuring device 30 and also to include a transmitter 32 and a receiver 34 both of which are electronically tunable at a rapid rate, for instance using varactors and frequency synthesizers in a manner being commercially done in modern units of this type. Ordinarily, the airborne DME unit 28 includes a repetition rate oscillator (not shown) which delivers triggering pulses on wire 29 which is brought out of the unit 28, and which pulses then go back into the unit on wire 31. The unaltered DME portion 30 of the airborne unit 28 is normally triggered at the rate of about ten times per second to measure range to the ground station selected. This triggering path represented by the wires 29 and 31 is usually one continuous wire within the equipment, but it has been brought out and broken by an AND gate 36 so that an inhibit signal which is inverted from wire 38 can be used to prevent performance of the airborne unit's DME function. The other modification of the standard DME unit 28 is that the two wires 33 and 35 which normally control the electronic tuning means respectively for the transmitter 32 and receiver 34 have been broken and brought out of the unit so that the transmitter and receiver can each be externally tuned. Otherwise, the unit 28 remains essentially as purchased and is unchanged except for the fact that the video output of the receiver 34 has been brought out of the unit on wire 37 for the purposes hereinafter explained.

Other equipment in the aircraft includes, as is the case in the Michnik patents mentioned above, a time clock 40 which comprises a clock oscillator 42, a main slot counter 44 driven by the oscillator 42, and a slot logic circuit 46 driven by the slot counter to count out the repeating cycles of time slots comprising each epoch. These time slots are delivered in binary form on a group of wires 48 by the logic circuit 46, and this circuit also delivers a selected time slot indication on wire 45 which comprises the time slot occupied by the present aircraft A as selected by the pilot using the knob 41. The logic circuit 46 also delivers on wire 43 an indication of the first slot 000 in each time slot cycle.

The present clock 40 in the aircraft is periodically synchronized to the master time on the ground, using any one of a number of different prior art systems, the present disclosure employing one of the systems shown in the Michnik patents mentioned above. This synchronization is accomplished by having the digital DME portion of the VORTAC/TACAN unit in the aircraft deliver an output to a synchronizer 50 on wires 51 giving a digital representation of the range which is then converted in the synchronizer 50 to a clock reading corresponding to the signal propagation time delay. This digital representation is converted into the same time base as the slot counter 44 by the synchronizer 50 which then temporarily retains this representation of range using a series of binary output stages corresponding with the binary stages of the slot counter 44. When an enable signal appears on the wire 52 from the gate 54 the count representing range in the synchronizer 50 is forced via the wires 53 into the slot counter 44 so as to correct its present count and thereby synchronize it with the master time on the ground. This enable signal occurs when the receiver in the DME unit 28 delivers video on the wire 37 to a SYNC pulse group decoder 56 which decodes the video as being the synchronizing pulse group transmitted by the ground station in the first time slot of the repeating time base. In other words, if this synchronizing pulse transmitted by the ground station travels over the range between the ground station and the aircraft, it should be delayed by its transit time such that the slot counter 44 if perfectly synchronized would read a delay corresponding with the digital range delay appearing on wires 51 when converted by the synchronizer 50 to the same time base as the slot counter 44. Thus, when the synchronizing pulse decoder 56 delivers an output on wire 57 and the AND gate 54 passses this output in slot 000 through the wire 52 and enables the synchronizer, the latter forces the slot counter 44 to read the delay which is correct for the distance between the aircraft and the ground station. This is all extensively discussed in the above mentioned Michnik patents. Some synchronizing systems also include means for correction of the clock oscillator 42 itself by dragging its frequency to make it run faster or slower in response to early/late measurements. In order that the present system may also illustrate and include this type of synchronization if desired, the wire 55 is shown between the synchronizer and the clock oscillator 42 to adjust its frequency or phase.

For the purpose of collision avoidance and navigation and for the purpose of data link, assume a different transmitting and receiving frequency for the transmitter 32 and the receiver 34 than the frequencies which were used for VORTAC/TACAN/DME purposes. In the present invention it is assumed that the CAS and data link frequency will be assigned in the same general frequency band as the VORTAC/TACAN/DME frequencies. This assumption is made in order to facilitate the problem of tuning the same transmitter and receiver in the aircraft to accomplish all of these purposes.

When performing collision avoidance one-way range measuring and telemetry, it is assumed that the time clock 40 in the aircraft is accurately synchronized with the ground station and that it will be kept synchronized by the synchronization system briefly described above, or alternatively, that the clock 40 uses an atomic clock requiring no periodic synchronization. The slot logic circuitry 46 delivers indications of the various time slots on a group of wires 48 which extend into a one-way range measuring system 60 for measuring the range from the present aircraft to each other aircraft during the time slots assigned to those other aircraft. It will be recalled that each aircraft is assigned one slot for its own transmissions, and this uniquely selected slot is signalled on the wire 45. Moreover, the logic circuit 46 delivers an output on wire 47 at a predetermined moment of transmission just after the beginning of each time slot, and each aircraft has an encoder 62 which encodes its own ranging pulse group at said predetermined moment and delivers it on wire 77 to be transmitted by the transmitter 32. This pulse group is picked up by all other participating units to furnish an indication of that aircraft's present range. The encoder 62 is actuated by the simultaneous occurrence of outputs on wires 45 and 47.

Each aircraft is identified by the time slot which it occupies in a manner well known in the prior art. Therefore, when the one way range measuring unit 60 receives an input pulse group from another aircraft in another time slot, such pulse group being decoded by the decoder 64 and delivered to the range measuring circuit 60 via the wires 65 and 67 through the AND gate 66, the circuit 60 can measure the transit time of the pulse group, knowing that it was transmitted at the predetermined moment signalled via the wire 47 and that it was received a certain time later via the wire 67, and therefore the aircraft can determine the range to the other aircraft by that transit time. It also displays this range locally within the aircraft upon a CAS display 68 of suitable type, and it delivers on cable 69 an indication of the range and on wires 92 an indication of the presently occurring time slot, these indications arriving at the telemetry circuit 70 which is part of the data link system. The telemetry circuit 70 includes temporary storage for storing the range to the aircraft occupying that time slot and the number of the slot it occupies until this range and identity can be encoded and transmitted to the ground via the transmitter 32. The telemetry system is connected also to a digital altimeter 72 which is used to encode the aircraft's own altitude for transmission to the ground data link system. These units therefore make it possible to have each aircraft deliver data to the ground computer 16 so that the computer can determine a geometric figure serving to locate the various aircraft on its display 18. The ground system may also return instructions via the data link 14 to whichever aircraft it specifically addresses for this purpose.

The aircraft data link system can either be entirely separate from the CAS system, or else it can be a part of it as suggested in my U.S. Pat. No. 3,434,140. One satisfactory way to unite the data link and the CAS functions on a common frequency in a time sharing mode of operation is to have each aircraft use the last portion of its own time slot, after it transmits its own encoded ranging pulse in response to signals on the wire 45 and 47, the aircraft thereafter and still within its own time slot reading out the information which it has determined including its own identity, its own altitude as determined by its digital altimeter 72, and the stored ranges to other slot-identified aircraft as measured by the range measuring system 60. All of this information is read out in serially encoded fashion through the gate 76 onto the wire 77 to the transmitter when the wire 45 indicating the aircraft's own time slot is enabled, suitable delay being included in the telemetry system to withold transmission of the stored information until after the unit's own encoded ranging pulse group has been transmitted from the unit 62. Thus, the computer 16 will be continuously taking in data from various participating aircraft during the time slot occupied by each of those aircraft and sorting out that data to determine the geometric figure which can be displayed on the display unit 18 which will show the correct mutual relationships between the various aircraft, and perhaps some fixed ground points in the overall system, all as described in my U.S. Pat. No. 3,434,140.

If the situation includes ground control of the aircraft, instructions can be telemetered back to the aircraft via the data link transmitter and receiver unit 14, and this data will appear at the output of the receiver 34 in the aircraft on the video wire 37. This information will pass through the gate 78 and into the address decoder 82. If the address of that aircraft is included, the data then goes on to the telemetry decoder 70, and then down to an instruction display unit 80 via the cable 81. In view of the fact that there is a great difference between the amount of information coming into the computer from all of the various participating aircraft by way of the data link, and the relatively small amount of information which the computer will be returning to the various aircraft as instructions thereto, it is attractive to have the computer communicate only with one aircraft at a time during the first time slot in the cycle, i.e., in the same time slot as the master time clock uses for sending out synchronizing pulses through the VORTAC/TACAN station. Thus, the master time clock can actuate the computer 16 on wire 13 to deliver instructions via wire 17 to the data link transmitter and receiver unit 14 which will then transmit these instructions with such address identification as is included in the message to inform the aircraft as to which one thereof is being instructed at the moment. An output on wire 43 will enable the gate 78 only during the synchronizing time slot 000 and the decoder 82 will recognize the address of the particular aircraft being instructed from the ground during that time slot and will then pass the instructions to the telemetry decoder 70 and thence to the instruction display 80.

TRANSMITTER/RECEIVER TUNING

What has been described above is necessary for background in the present invention, but comprises mostly the state of the prior art as it is suggested, for instance, in the above mentioned patents to me and to Michnik, and perhaps in other patents of the prior art suggesting clock synchronization and collision avoidance systems.

It will be recalled that the purpose of the present invention is to integrate distance measuring, clock synchronizing, collision avoidance, and data telemetering functions all into a common repeating time cycle without seriously degrading any of the functions performed.

It will also be recalled that earlier in this specification it was stated that the collision avoidance function could not be moved around in real time in order to accomodate the other functions because of the fact that collision avoidance depends on the times of transmissions by other aircraft which are not under the control of the present aircraft. Moreover, in generally occurring traffic situations the times of transmissions of these other aircraft must be considered to be non-predictable in any specific aircraft except by listening for such transmissions. It is only in an ordered "stationkeeping" system as shown in FIG. 4 in which everybody knows the times of transmissions of all participating aircraft so that the times when they must be listened for are determined in advance. On the other hand, distance measuring can be done at random times determined in the local aircraft so long as these times do not interfere with collision avoidance exchanges of signals. The data link transmissions and the clock synchronizing pulses also occur at fixed and predetermined times. The present invention is therefore illustrated by a system in which an epoch is assumed to include the above-mentioned two thousand time slots, each of 1500 microseconds duration with clock synchronizing occurring in the first time slot together with telemetering from the ground to any aircraft, and data link being accomplished from each aircraft to the ground within the time slot specifically assigned to that same aircraft. These assumptions leave only the distance measuring normal VORTAC/TACAN functions in doubt as to when they can occur. The DME functions are not critical as to their times of occurrence provided that the range measurement which determines the digital range used for clock synchronizing purposes in that particular aircraft be done often enough and recently enough that the range to the ground station will not have changed materially before it is used for clock synchronization. Commercial DME systems of course include means for predicting range from prior measurements during loss of signal and therefore the measurements can "coast" for several seconds if required. Moreover, the normal VORTAC/TACAN function of the system can also include the measurement of azimuth with respect to the particular ground staiton being interrogated, but this point is not discussed herein since it does not affect the present novel features being disclosed.

FIGS. 1 and 2 show a system in which the DME function is performed only after it has been determined which time slots of the repeating epoch are actually occupied and in use by an aircraft posing a possible collision threat in the near future, and in this illustrative embodiment the normally-recurring DME function is merely inhibited during such time slots. Moreover, it is likely that only a very few of the two thousand time slots available during each epoch will actually be threateningly occupied in a particular area and therefore there will be considerable intervals of time during which the DME can be allowed to freely repeat the performance of its normal function. These intervals of time, however, must be determined by occupancy distinguishing means which listens to all of the time slots in order to find out which time slots are occupied and therefore unavailable for DME purposes, and which series of time slots are unoccupied so that the DME system can be allowed to perform its normally intended function. The present system proposes never to interrupt the CAS time slot cycle except during intervals thereof which are known to be not-significantly occupied as determined by listening to a complete series of time slots and noting those time slots in which ranging pulses were received from other aircraft, or alternatively noting series of time slots in which no such ranging pulses were heard. This disclosure proposes two possibilities wherein (1) mere occupancy of a slot rules out use of it for DME purposes; or (2) having determined mere occupancy, the system then goes on to evaluate whether the occupying aircraft poses a real threat or not, as determined by its altitude, range, range rate, or other known parameters, and then inhibits the DME function only if the threat is real and proximate. This determination could be made continuously by providing a separate receiver tuned always to the CAS frequency for noting the time slots which are, or are not, occupied. However, although this may be a possible alternative, FIG. 1 actually shows means by which a complete cycle of time slots can be monitored by the DME receiver 34 so as to avoid the necessity of employing an additional receiver.

The system in FIGS. 1 and 2 assumes the worst case in which the frequency retuning time of the transmitter and receiver is long, for instance 1 millisecond, and therefore in order to give time in which to shift over for a DME function and determine range to a distant ground station when an unoccupied interval of time slots is available and then to shift back again to CAS function when such function is anticipated it is necessary not only to know which slots are occupied or unoccupied, but also to have some way of knowing some time in advance so that the changing of the receiver and transmitter tuning can be started in plenty of time to allow their completion before the next function is actually to be performed. In the present illustration it is assumed that the time required for retuning is of the order of one time slot duration. For this purpose, the present system provides an additional slot logic circuit 90 which is similar to the slot logic circuit 46 to the extent that it counts out two thousand time slots, but it is wired so that it counts two time slots earlier than the slot logic 46. This is part of the occupancy-distinguishing system and operates such that when the slot logic 46 is counting slot number 000 slot logic 90 is counting slot number 1998, and likewise when slot logic 46 is counting slot number 095, slot logic 90 is counting slot number 093, etc. As stated above, these two logics are both connected to be driven in parallel by the wires 91 from the slot counter 44 but they are internally wired differently. However, they do advance in unison as the slot counter 44 progresses through its count. As stated above, the decoder 64 delivers on wire 65 an indication that a slot is occupied by another aircraft, and the CAS range measuring circuit delivers the number of the slot when it is occupied on the wires 92 to a memory circuit 94 which remembers the numbers of occupied slots which it receives when actuated by an input on wire 65 to the memory circuit 94, assuming that the gates 96 and 98 in series with the wire 65 are conductive. Thus, at the output of the occupied slot memory circuit 94 on wires 95 there appears a succession of numbers of slots which are actually occupied, and these slot numbers are delivered to a comparator 97.

For present purposes, an interval can be thought of as being divided into two successive epoch cycles, each one of which starts with a slot 000 and ends up with a slot 1999 just before the next 000 slot. This two-cycle interval is shown in FIG. 2. The present system operates in such a way that during occasional time slot cycles the system will not perform any DME function, but merely listens and performs CAS functions. Then during other time slot cycles the system does not monitor the time slots at all but merely performs the CAS functions in those time slots which it found to be occupied and permits the DME to perform its function in the other unoccupied slots. For this purpose, an output is taken from the slot logic circuit 46 on wire 100 indicating each time that the slot 1998 occurs during either cycle. These cycles, or portions thereof, are then divided by a bistable flipflop 102 into a first cycle in which CAS and LISTEN functions are performed and into a second cycle in which CAS and DME functions are performed. Assuming that a CAS and LISTEN cycle is the first cycle considered herein, an output will appear on wire 104 and its leading edge will be detected by a leading edge detector 106 which will reset the occupied slot memory 94. The output on wire 104 will also pass through an OR gate 108 and continuously inhibit the DME by blocking the AND gate 36 by a signal on wire 38 which is inverted at the input to the gate. Moreover, the output on wire 104 will pass through another OR gate 110 and hold the flipflop 112 continuously in the CAS condition of conductivity, meaning that the device 114 for selecting a CAS frequency as manually determined by a switch thereon will enable the transmitter and receiver tuning voltage generator 116 to deliver the proper outputs on wires 33 and 35 to tune both the transmitter and the receiver to the selected CAS frequency. The output on wire 104 will enable the AND gate 96 so that signals representing time slots that are occupied can enable the memory 94 to record their time slots, respectively. Thus, three types of time slots will have their slot numbers recorded in the memory 94: namely, the time slot 000 in which ground synchronization pulses are broadcast and any other time slots set aside for the broadcast if synchronization pulse groups, the aircraft's own time slot, for instance time slot 095 in the present illustrative embodiment, and whichever other time slots are occupied by other participating aircraft in the vicinity, for instance, time slots 907, 1609, and 1825 which are occupied by other nearby aircraft. If the system is of the type where mere occupancy is not enough to inhibit the performance of a DME function in an unoccupied time slot then the CAS system 60 will also include a threat evaluation circuit 63 whose output on wire 63a indicates the existence of an actual threat of collision, and this output enables the AND gate 93 to enter that slot identity into the occupied slot memory 94. When time slot 1998 occurs at the end of the first cycle of the epoch, another output will appear on wire 100 and together with the output on wire 104 will enable the gate 105 to actuate the bistable flipflop 102 to disable the output on the wire 104 and enable an output on the wire 120 to initiate the performance of both CAS and DME functions during the next time slot cycle. As a result, the DME is no longer inhibited by the wire 104 and is allowed to perform its regular functions unless inhibited by the other input to the OR gate 108 as follows. Since the time slot counter 90 is counting two time slots earlier than the main time slot counter 46, it has just counted time slot 000, and since this is one of the time slots stored in the occupied slot memory 94 the comparator will deliver a coincidence signal on wire 99 and this signal will pass through the gate 122 and enable a circuit 124 which, in response to each input on wire 99, puts out a signal which lasts for the duration of four time slots, namely, 6000 microseconds. However, it should be remembered that although the slot logic 90 has counted the slot 000 the actual time slot count is still just passing the slot 1998. Thus, the "occupied" output of the four-slot-duration circuit 124 on wire 126 will pass through the AND gate 128 and enable the wire 130 to inhibit the DME function for the duration of the voltage on the wire 126 which appears two slots before each occupied slot and lasts until one slot thereafter. Accordingly, the DME will not function during or around the time slot 000, and the transmitter and receiver frequencies will still remain tuned to the CAS frequency because of the "occupied" signal passing through wire 126 and the OR gate 110 to maintain the flipflop 112 on the CAS tuning frequency. Assuming that there are a number of time slots available after time slot 000, however, the output on wire 126 will disappear at the end of time slot 001 and an inverter circuit 132 will deliver an output on wire 134 to switch the flipflop 112 to the DME position in which it will enable the DME frequency channel selecting circuit 136 to deliver an output to drive the transmitter and receiver tuning voltage generator 116 to put out such outputs on wires 33 and 35 as are requested to tune the transmitter 32 and the receiver 34 to the DME channel frequencies as selected by the dial in the selector 136. The transmitter and receiver in the airborne VORTAC/TACAN unit 28 will remain tuned to the DME channel until another threateningly occupied slot approaches. In the present example this will comprise the slot 095 whose slot number is recorded in the occupied slot memory circuit 94, but the earlier slot logic circuit 90 will reach a count of slot 095 when slot 093 is actually occurring in real time as determined by the slot logic circuit 46. Nevertheless, coincidence will occur during slot 093 and therefore an output will appear on the wire 99 from the comparator 97 and will again inhibit the DME and shift the tuning of the transmitter and receiver over to CAS frequencies using the output on wire 126 from the duration one-shot 124. This voltage will remain on the wire 126 for at least four time slots including time slots 093, 094, 095, and 096. However, if another aircraft should appear in a time slot before the four slot duration voltage on the wire 126 terminates, a new coincidence output will appear on wire 99 and will further maintain the circuit 124 enabled for four more time slots. When eventually a gap occurs in the occupied time slots, then the "occupied" output signal on wire 126 will disappear thereby re-enabling the DME to resume its normal DME operation and at the same time retuning its transmitter and receiver to the selected frequencies of the DME channel selected.

This continues at least until the end of the second cycle of time slots in the interval, or nearly to the end thereof, and in time slot 1998 the output on wire 100 will again appear and be ANDed with the output on wire 120 in gate 103 to deliver an output on wire 107. This output goes to a randomizing circuit 101 which serves to sometimes pass and sometimes block the signal on wire 107. Such randomizing circuits are known in the prior art and often comprise a noise generator randomly enabling or blocking an AND gate. The purpose of the randomizing circuit 101 is to prevent various aircraft from accidentally falling into step so that they are always "listening" or performing DME functions in unison. If the randomizing circuit 101 is conductive, the signal on wire 107 will shift the bistable flipflop 102 to the LISTEN position, thereby delivering an output on wire 104 which will reset the "occupied" slot memory, open the gate 96 to permit the circuit to memorize slot numbers of slots appearing to be threateningly occupied and block the DME function during the whole first time slot cycle. If the randomizing circuit 101 is blocked, the system will remain enabled by wire 120 for another time slot cycle.

Another way of listening for time slots than can be safely used for performance of the DME function is to examine only a fraction of the 2,000 time slots in an epoch at any one time. For instance, it is possible to examine 500 of the slots and then update the occupied slot memory 94 as to these slots, subsequently examining a different 500 slots the next time. In this way, examination of all 2,000 slots can be accomplished without ever interrupting the DME function for more than one second at a time. Until the LISTEN function is again initiated, the DME will be able to perform its normal function for most of the elapsed time since it is improbable that more than a very few aircraft in occupied slots will simultaneously be threateningly close in range, say within forty miles, and at approximately the same altitude, say within two thousand feet, and/or are closing at a velocity posing immediate danger. However, those slots in which a real threat exists must be continuously monitored, leaving the rest of the slots available for DME purposes without practical degradation of any function.

The above embodiments are made especially difficult by the assumed slowness of retuning, i.e., 1 millisecond. A much simpler system is possible using DME transmitting and receiving equipment in which only 20 microseconds is required for retuning, assuming that a total range of 100 miles is all that is needed for CAS purposes, an assumption that suits low-flying general aviation quite well. This embodiment uses the early part of each 1,500 microsecond time slot for CAS threat evaluation and leaves the remainder of the slot for the performance of DME functions after a collision avoidance threat has been determined not to exist.

Referring not to FIG. 4, this figure shows a block diagram of a modified system according to the invention in which all of the equipment involved is airborne, and in which a leader aircraft D is used to control a group of follower aircraft such as the aircraft E and F, operating in a stationkeeping mode with respect to each other and with respect to the leader aircraft. This figure shows that the leader aircraft includes an interrogatable DME transponder unit 210 which transmits and receives via an antenna 211, and this unit cooperates with the airborne DME equipment 228 located in each of the follower aircraft, of which the aircraft F is typical. A master clock 212 in the leader aircraft is used to supply master time in all of the participating aircraft, and this masterclock also includes conventional means for counting the cycles of time slots in which the various aircraft operate. Although in the example shown in FIGS. 1 and 2 there were 2,000 time slots, in a stationkeeping system, for instance for military purposes, there might be a lesser number of aircraft, perhaps twenty, with a total of say 100 time slots available. Typically, in the manner taught in the prior art mentioned above, the leader aircraft D can be assigned to time slot 00, and the follower aircraft will then each be uniquely assigned to other time slots, such for instance as the time slot 32 for the aircraft E and the time slot 67 for the aircraft F. For purposes of synchronizing the other time clocks in the follower aircraft, the leader aircraft D will transmit synchronizing pulse groups in time slot 00.

It simplifies matters to have the aircraft clock synchronizing pulse groups transmitted in slot 00, and perhaps also in others of the 100 slots, by the leader aircraft at the same frequency at which the airborne DME transponder unit 210 replies to interrogations by the other aircraft so that no switching of frequency for the transmitter and receiver within the aircraft D is necessary. It is further assumed in this embodiment that if telemetry is to be used in the system, the navigation and steering instructions transmitted by the master aircraft D, will be transmitted on this same frequency and that these transmissions will be made to specifically address follower aircraft within time slot 00 immediately following the synchronizing pulses.

In the present illustration the features which are shown in FIG. 4 as contained within the follower aircraft F are typical of all of the other follower aircraft participating in the station-keeping system. The follower aircraft has an antenna 226 by which all pulse and encoded signals are exchanged with other units in the system including the leader aircraft D. The antenna 226 is connected to an airborne standard DME unit 228 which, except for minor modifications discussed in connection with FIG. 1, is a standard digital unit purchasable off the shelf. The unit 228 includes digital distance measuring equipment 230, and a transmitter 232 and a receiver 234, both of which are electronically tunable at a very rapid rate, for instance using varactors and frequency synthesizers, so that changing frequency can be done within 20 microseconds in the fastest of the standard units. Unlike the embodiment discussed in FIGS. 1 and 2 which assumes relatively slow retuning requiring about 1 millisecond, the embodiment shown in FIG. 4 assumes such fast retuning, within 20 microseconds, that it can be done in the same time slot as other functions occur in. The airborne DME unit 228 also includes a repetition rate oscillator (not shown) which controls the rate at which the DME function is repeated by delivering trigger pulses on the wire 229. In the unaltered DME, the wires 229 and 231 comprise a continuous unbroken wire which is triggered at the rate of about 10 times per second to measure range to the central DME transponder unit selected, but in the present illustrations this triggering path represented by the wires 229 and 231 is broken by an AND gate 236 so that the performance of the DME function can be inhibited or enabled according to a function control system which controls the switching between DME and CAS functions. The other modification of the standard DME 228 is that two wires labelled 233 and 235 which normally control the electronic tuning means respectively for the transmitter 232 and the receiver 234 have been brought out of the unit so that the tuning potentials on the varactors can be externally selected as described below.

Other equipment within the aircraft includes a time clock generally referred to by the reference character 240 which comprises a clock oscillator 242, a main slot counter 244 driven by the clock 242, and a slot logic circuit 246 driven by the slot counter to count out the repeating cycle of time slots within that particular aircraft. These time slots are delivered in binary form on a group of wires 248 extending from the logic circuit 246 which also delivers a selected "own" time slot indication on wire 245 as manually selected by the pilot, using the knob 241. The slot logic 246 also delivers on a wire 243 an indication of the first slot 00 in each time slot cycle.

This over-all time clock system 240 in the aircraft is periodically synchronized to the master time in the leader aircraft D, which synchronization is accomplished, as in FIG. 1, by having the digital DME 230 deliver an output to a synchronizor 250 via wires 251 giving a digital representation of the range to the leader aircraft, which range in then converted in the synchronizor 250 to a clock reading corresponding to the signal propagation time delay between the aircraft F and the leader aircraft D, the digital representation being in the same time-base as the one used in the main slot counter 244. When an enable signal appears on the wire 252 from the gate 254 as a result of decoding a sync pulse group in the decoder 256, the count representing present range within the synchronizor 250 is forced via the wires 253 into the slot counter 244 so as to correct its present count and thereby synchronize it with the master time in the master clock 212. This general operation has already been described in considerable detail in connection with FIG. 1, supra.

In the present embodiment, the CAS function and the telemetry system are controlled by the time clock 240 in the follower aircraft F. Accordingly, the time-clock slot logic circuitry 246 delivers indications of the sequential time slots as they occur on a group of wires 248 which extend into a CAS one-way range measuring system 260 for measuring the range from the present aircraft to each of the other participating aircraft during their respective time slots. It will be recalled that each aircraft is assigned to one slot for its own transmissions, and this slot is signalled within the aircraft on the wire 245. Since this is a stationkeeping system, all of the time slots within the over-all system will be known in advance either to be unoccupied or else to be occupied by a specific aircraft, and, therefore, each aircraft is fully identified by the slot which it occupies and there are no other participating aircraft which might unexpectedly occupy other slots. This is the basic difference between this embodiment and the one shown in FIGS. 1 and 2. The slot logic circuit 246 delivers an output on wire 247 at a predetermined moment just after the beginning of each time slot, including the aircraft's own time slot, when it will transmit its own encoded ranging pulse group as originated by an encoder 262 which is enabled during the aircraft's own time slot by output on wire 245, whereby the aircraft can be ranged upon by all other aircraft whose decoders 264 can distinguish this ranging pulse group from a DME interrogation pulse group which is differently encoded.

During other slots the aircraft can receive a ranging pulse group from another aircraft, such group being decoded by a decoder 264 and delivered to the range measuring circuit 260 via the wires 265 and 267 through an AND gate 266, the circuit 260 then measures the transit time of the pulse group from the other aircraft based on the fact that the pulse group was transmitted by the other aircraft at the predetermined moment signalled on its wire 247. Hence the aircraft knows when the pulse was transmitted by the other aircraft and when it was received locally. The determined range is then displayed, for instance, by a CAS display unit 268 of suitable type, and it can also be delivered on cable 269 to a telemetry and storage unit 270 that is a part of an interaircraft data link system which includes temporary storage for storing the ranges to the aircraft occupying the various time slots and storing the identity of each time slot which is delivered on the cable 292 to the telemetry system. As in the case of FIG. 1, another feature of the telemetry system can be a digital altimeter 272 which delivers its altitude reading for the present aircraft for transmission through the data link system.

The data link system can either be entirely separate from the CAS system or else it can be a part of it as suggested in my U.S. Pat. No. 3,434,140. One satisfactory way to unite the data link and the CAS functions on a common frequency in a time-sharing mode of operation is to have each aircraft use the last portion of its own time slot, after it transmits its own encoded ranging pulse group to read out the information which it is currently storing including its own altitude, the ranges to other aircraft as measured by its CAS ranging circuit 260, and the identities of the other aircraft typically represented by their time slots with respect to which range was taken. All of this information can be read out in serial encoded fashion through the gate 276 to the wire 277 for transmission when the wire 245 indicates that the aircraft's own time slot is enabled. Conversely, the leader aircraft D can telemeter instructions to a specific follower aircraft using as the data link the receiver 234 and the video wire 237, these transmissions being made in the slot 00 and passing through the gate 278 during this slot into an address decoder 282 which performs the function of recognizing the local aircraft's address and then passing the encoded instructions to the telemetry and storage unit 270 from which it travels via the wire 281 to a readout circuit 280 for indicating to the pilot of the follower aircraft the instruction coming from the lead aircraft D.

It will be recalled that the purpose of the present invention is to integrate DME, CAS, clock Synchronizing, and data Telemetry functions, all using a common time-slot cycle and using common transmitter and receiver means. The collision avoidance and ranging measurements performed by the circuit 260 must, of course, be accomplished during the time slots which are already known to be occupied by the particular aircraft participating in the stationkeeping system. The clock synchronization takes place in the time slot 00 and uses information obtained by the DME circuit 230 which must be operated at such times as will not interfere with the CAS function. However, the main difference between the present system and the one shown in FIGS. 1 and 2 is that the particular times at which these various functions must be performed to avoid interference therebetween are all previously known, and are unchanging from one time cycle to the next, unless they are changed with the full knowledge of the personnel participating in the stationkeeping.

For the purposes of the illustration of FIG. 4, it is well to establish which frequencies the various functions will be performed on for both transmissions and receptions at the follower aircraft and at the leader aircraft. For this purpose, it is assumed that in the stationkeeping system presently being discussed, the follower stations will interrogate the DME transponder unit 210 in the leader aircraft by its encoded DME interrogation pulse group on frequency $f1$, and that the leader aircraft will respond on frequency $f2$. This of course means that the leader aircraft transmits on $f2$ and receives on $f1$ for the DME function. However, there are other functions to be performed by the system. A second function is the sending of telemetry instructions from the leader to the followers and the sending of data by the followers to the leader in the data link system. It will be assumed that transmissions from the leader to the follower for telemetry data link will occur on frequency f2 and that these will occur during the time slot 00 and will be encoded differently from DME replies initiated by the leader aircraft DME transponder unit 210, and that the follower stations will transmit such data as they have to the leader stations during their own time slots on frequency 1.

In addition, there is still another general type of function performed in time slot 00, namely the transmission of specially encoded synchronizing pulse groups from the leader to the follower aircraft, and these will be transmitted by the leader on frequency $f2$ near the beginning of time slot 00 and just prior to the telemetry transmissions from the leader. Finally, the CAS functions will occur still differently encoded during the aircraft's own time slot, and it is assumed that all such CAS functions will occur on frequency $f1$. This is an arbitrary assumption, but makes it possible for the system to use only two frequencies total, namely $f1$ and $f2$ for performing all functions. Therefore, in this particular illustrative embodiment the leader aircraft never transmits except on frequency $f2$ and never receives except on frequency $f1$, and it is accordingly unnecessary that the transmitter or receiver in the leader aircraft have its tuning changed at all, unless it were to be decided that a third frequency will be used for CAS as was suggested in the case of FIGS. 1 and 2. Conversely, the follower aircraft never transmits except on frequency $f1$, and therefore its transmitter does not require retuning. However, the receiver of the follower aircraft does require retuning since it receives DME, telemetry, and clock synchronization groups on frequency $f2$, but it receives CAS ranging pulse groups from other aircraft in their time slots on frequency $f1$.

Turning again to FIG. 4, it will be recalled that the identities of the time slots which are actually occupied are all known in advance because of the fact that this is a stationkeeping system having only preassigned aircraft participating. For this purpose occupancy-determining means including an occupied slot counter 294 is provided which is similar to the counter 244, but which couples to a set of logic switches 296 by which the pilot can preset occupied slot numbers, i.e., slots occupied by the other participating aircraft. For this purpose, the counter can have as many switches as there are slots to be occupied, and these switches comprising part of the logic for providing output on the wires 295 to a comparator 297, the wires 295 identifying each time slot which is in fact occupied. The other side of the comparator is connected to a cable 248 which comes from the slot counter logic 246 and identifies the time slot presently being counted. Thus, when the time slot being counted corresponds with one of the time slots known to be occupied as signalled from the circuit 294-296, an output appears on the coincidence wire 299, indicating at the beginning of the time slots that it is an occupied slot. The beginning of each new time slot is signalled by an output on wire 200 from the slot logic circuit 246, and this output together with the output on the coincidence wire 299 is delivered to two different gates respectively labelled 291 and 298.

The system also includes function-controlling means which operates such that when the wire 200 signals the beginning of a new time slot and at the same time an output appears on the coincidence wire 299, the AND gate 291 will put out a signal indicating that this is an occupied time slot which is just beginning, and therefore, the flipflop 202 will be flopped to enable an output on wire 204 indicating that this is a slot in which other aircraft will be transmitting their CAS position marking pulse groups, and therefore, the output on wire 204 will inhibit the gate 236 and thereby prevent the wire 231 from receiving trigger pulses from the wire 229, so as to block the performance of the DME function. At the same time, the output on the wire 204 will drive the select CAS input of the receiver tuning device 227, thereby to tune the receiver via wire 235 to the CAS frequency f1.

On the other hand, if there is no coincidence in the comparator, the output on the coincidence wire 299 will be low, and will be inverted at the input of the gate 298, thereby to flop the flipflop 202 to enable the wire 205. However, with this wire enabled, meaning that the time slot is not occupied by another aircraft, the select DME input wire 205 will cause the receive tuning device 227 to select the other receive frequency f2, and on this frequency the aircraft will not only be able to receive for DME purposes from the master aircraft, but it will also be able to receive telemetry instructions from the master aircraft and receive clock synchronization from the master aircraft, the latter two functions being performed in time slot 00 at frequency f2. Hence, it is only during time slots occupied by other aircraft as signalled by the comparator 297 that the receiver in the follower aircraft need be tuned to the frequency f1. At all other times, the receiver in the follower aircraft is to be tuned to the frequency f2. The above circuitry shown in FIG. 4 accomplishes all purposes using only the two frequencies in the stationkeeping mode. A third separate frequency for CAS is really not necessary except in a system in which there is more than one selectable master source, for instance, as in the situation shown in FIGS. 1 and 2 in which there are a number of entirely different ground VORTAC/TACAN stations each of which is selectable on a different channel, comprising a pair of frequencies, and there is no way of telling which one of these ground sources a particular aircraft will be using for DME purposes. Accordingly, it becomes necessary to have a third frequency on which all of the CAS functions for all involved aircraft are being performed.

This invention is not to be limited to the exact forms shown in the drawings for obviously changes can be made within the scope of the following claims.

I claim:

1. An aircraft navigation and collision avoidance system (CAS) of the time-sharing type in which participating aircraft occupy separate time slots in a repeating time-slot cycle and have their own airborne time clocks synchronized to a system-wide master time, and the system including common distance measuring DME transponder means interrogatable by the aircraft of an exclusively assigned transmit and receive frequency channel for determining range thereto, comprising the combination of:
   a. airborne distance measuring equipment (DME) in the aircraft and each including agile electronically-tuned transmitter and receiver transponder means, the airborne DME being operative when actuated to function to determine range to the common DME means whose channel is selected;
   b. CAS function means in each aircraft and operative when actuated to encode a position marking pulse group for transmission on a designated CAS frequency, and operative to function to determine range to other aircraft based upon the times of reception of position marking pulse groups received therefrom during monitoring of that frequency;
   c. occupancy-distinguishing means in each aircraft for distinguishing between portions of the time slot cycle which must be monitored and used for the CAS function and other portions of the cycle which are available for use in performing the DME function; and
   d. function-controlling means responsive to said occupancy-distinguishing means and operative during monitored portions of the cycle to tune said transmitter and receiver means to said designated frequency and actuate said CAS means, and operative during said available portions of the cycle to tune said transmitter and receiver means to the selected DME transponder channel and actuate said DME.

2. The system as set forth in claim 1, wherein the number of aircraft participating at any particular moment as well as the designation of which portions of the cycle must be used for the CAS function comprise unknown changing variables, said airborne clocks including means for counting time slots as they occur in each repeating cycle, said occupancy-distinguishing means including means for monitoring position-marking pulse groups received from other aircraft and for storing identities of the particular time slots in which they were received, and including means for comparing the stored occupied-slot identities with presently occurring slot identities; and said function-controlling means responding to coincidence in said comparing means as indicating occupied slots and to failure of coincidence as indicating unoccupied slots.

3. The system as set forth in claim 2, wherein said CAS means also includes means for evaluating the degree of threat posed by each aircraft whose position marking pulse group is received; and means based on the evaluated degree of threat for making available for the DME function those time slots which are occupied by aircraft posing a low degree of threat at the moment.

4. The system as set forth in claim 2, wherein said function-controlling means comprises means responsive to the progression from one complete time-slot cycle to another for alternating between one type of operation in which the function-controlling means actuates the DME function during unoccupied time slots and another type of operation in which the controlling means actuates the ranging-pulse group monitoring means for a complete cycle and the receiver means remains tuned continuously to monitor the designated CAS frequency.

5. The system as set forth in claim 2, wherein each common DME comprises a fixed VORTAC/TACAN type of station operating on separate and unique transmit and receive frequencies by which it is selected, each such station including means operative during at least one predetermined time slot for transmitting a clock synchronizing pulse group to participating aircraft selecting its channel, these pulse groups transmitted by the stations being all synchronized to said master time; and said aircraft including means responsive to the measured range of the selected DME station and to the time of reception of a transmitted synchronizing pulse group therefrom for synchronizing its own airborne clock to said master time.

6. The system as set forth in claim 5, wherein the various DME stations use the same predetermined time slots in which to transmit their synchronizing pulse groups, and wherein each participating aircraft has means for entering into said means for storing identities of occupied time slots the identities of said predetermined time slots and the identity of the time slot occupied by the aircraft itself.

7. The system as set forth in claim 5, including data link means operative between the selected DME station and the participating aircraft and including means in the aircraft for encoding CAS data and transmitting it via said transmitter means during the aircraft's own time slot, and including means at said DME station for transmitting encoded navigation instructions to the aircraft during a time slot in which the station transmits said clock synchronizing pulse group.

8. The system as set forth in claim 2, wherein the agility of the tuning of the transmitter and receiver means is such as to require an interval for retuning which interval approaches the duration of a time slot, said occupancy-distinguishing means and said function-controlling means including means responsive to each occupied slot and operative for at least said interval before each such occupied slot to tune said transmitter and receiver means to said designated frequency, and operative for said interval of time both before and after each such occupied slot to block actuating of said DME.

9. The system as set forth in claim 1, comprising a stationkeeping system for a known number of participating aircraft respectively occupying predetermined ones of said time slots, each airborne clock including means for counting time slots as they occur in the cycle, and said occupancy-distinguishing means to which said function controlling means is responsive comprising presettable means for indicating which of said slots are occupied.

10. The system as set forth in claim 9, wherein the DME transponder means is contained within an aircraft flying as the leader of the stationkeeping system and originating the master time to which the stationkeeping system is synchronized, and the leader aircraft being assigned to occupy one of the time slots.

11. The system as set forth in claim 10, wherein the leader aircraft includes means operative during said one of said time slots for transmitting a clock synchronizing pulse group to the participating aircraft, and the latter aircraft including means responsive to the measured range to the DME transponder means and to the time of reception of each transmitted synchronizing pulse group for resynchronizing the airborne clock to said master time.

12. The system as set forth in claim 1, wherein the said CAS designated frequency is also the DME transponder interrogation frequency in the selected DME channel, and the position marking pulse group transmitted by each aircraft is encoded differently from the pulse group by which the aircraft interrogates said DME transponder means; and said function-controlling means is operative during unoccupied time slots to tune the receiver means in that aircraft to the DME transponder response frequency, and is operative during slots occupied by the aircraft to tune the same receiver means to the DME transponder interrogation frequency to receive the other aircraft ranging pulse groups.

* * * * *